Aug. 4, 1942.  W. L. SAVELL  2,291,833
PROCESS OF REGENERATING SULPHATE PULP COOKING LIQUORS
Filed Nov. 23, 1940
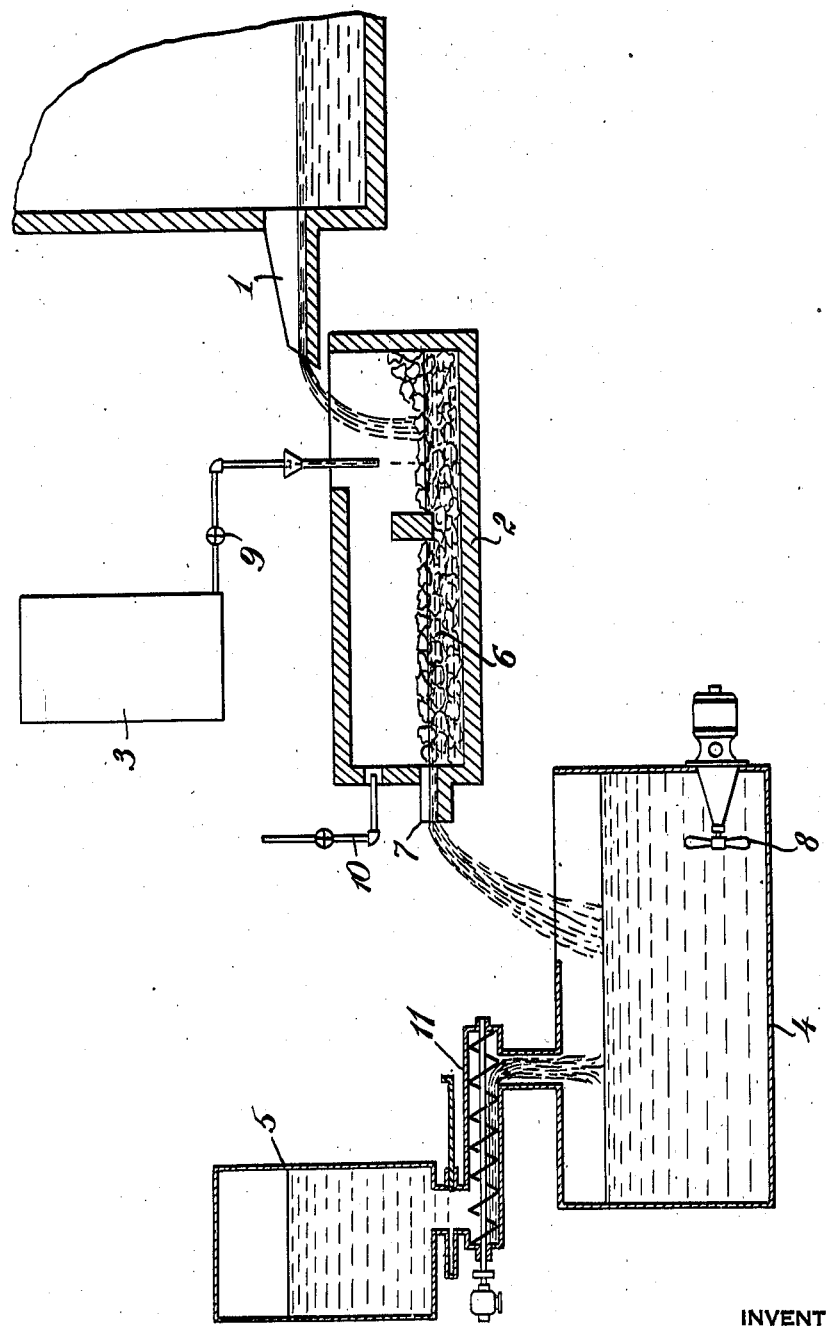
INVENTOR
Walter L. Savell
BY
Pennie, Davies, Marvin, & Edmonds
ATTORNEYS Patented Aug. 4, 1942

2,291,833

UNITED STATES PATENT OFFICE 2,291,833

PROCESS OF REGENERATING SULPHATE PULP COOKING LIQUORS

Walter Lee Savell, Forest Hills, N. Y., assignor to The Mathieson Alkali Works, Inc., New York, N. Y., a corporation of Virginia Application November 23, 1940, Serial No. 366,904

1 Claim. (Cl. 23—48)

This invention relates to improvements in the regeneration of sodium hydroxide-sodium sulphide cooking liquors for the production of wood pulp by the kraft or so-called sulphate process. Following the cooking operation, in which wood is pulped by the cooking liquor, the spent liquor is drained and washed from the pulp mass and processed for recovery of sodium hydroxide and sodium sulphide. As separated from the pulp, the spent liquor is known as "black liquor." This black liquor contains any unconsumed sodium hydroxide and sodium sulphide, compounds formed by reaction of these pulping agents with organic constituents of the wood and other organic material extracted from the wood during cooking. In the conventional recovery operation, this black liquor is dehydrated to form a dehydrated residue known as "black ash" containing a substantial proportion of organic material, this dehydrated residue is carbonized and burned to eliminate the organic matter and to regenerate the inorganic salts potentially present, and the inorganic residue is fused to produce a molten salt mixture consisting chiefly of sodium carbonate and sodium sulphide. This salt mixture is dissolved in water to form a solution known as "green liquor." This green liquor is causticized with lime, to convert sodium carbonate to sodium hydroxide, and the resulting solution, known as "white liquor" becomes available as fresh cooking liquor in the pulping operation. The steps of dehydration, carbonization, burning and fusion are carried out in a recovery furnace which may take a variety of forms (see for example Power, vol. 83, No. 5, pages 80–81, May, 1939). The heat of combustion of the organic matter eliminated is usually sufficient to maintain the operation and to supply heat to produce steam. Losses in handling and in the several processing steps require the addition of makeup material to maintain the required concentrations of sodium hydroxide and sodium sulphide in the cooking liquor. In conventional practice these losses are made up by the addition of sodium sulphate to the black liquor in the furnace, the sodium sulphate thus being reduced to sodium sulphide in connection with carbonization and combustion of the dehydrated residue or black ash. It is this characteristic of the general operation which has caused it to be designated as the "sulphate process" although sodium sulphate as such plays no part in the cooking operation itself.

The conditions, particularly of temperature and draft, which prevail in the ordinary recovery furnace involve not only losses from the introduced black liquor but also losses from the introduced makeup sodium sulphate. Such losses of makeup sodium sulphate amount to as much as 100 pounds or more of sodium sulphate per ton of pulp produced. It will be apparent that such losses impose a serious burden upon the economy of the sulphate process. The improvements of this invention afford important advantages in this respect.

In carrying out this invention makeup of the sodium hydroxide-sodium sulphide content of the cooking liquor is effected by adding sulphur to the molten salt mixture discharged from the recovery furnace in which the carbonizing and burning of the black ash is carried on, passing the resulting mixture through a charge of coke while maintaining reducing conditions in an auxiliary furnace, dissolving the reduced mixture in water to form the green liquor, and adding soda ash to the green liquor prior to causticization to form the white liquor. All losses incident to furnace processing of makeup soda are thus avoided and any remaining losses of makeup sulphur can thus be reduced to a negligible level. Important economies with respect to the amounts of chemical materials used and required to be handled are thus accomplished. At the same time improved control of the recovery furnace operation and of the composition of the cooking liquor is provided. Elimination of the burden of sulphate reduction from the recovery furnace also increases the amount of heat recoverable therefrom. Sulphur is added to the molten salt mixture discharged from the recovery furnace and soda ash is added to the green liquor prior to causticization in the proportions necessary to maintain the required concentration of sodium hydroxide and sodium sulphide in the cooking liquor. These proportions will vary as the losses of soda and sulphur vary in the particular operation.

One form of apparatus appropriate for carrying out the invention is illustrated in the accompanying drawing, in elevation and partly in section and with parts broken away. In this drawing 1 designates the discharge port of a conventional recovery furnace, 2 an auxiliary furnace or forehearth, 3 a supply of molten sulphur, 4 a dissolving tank and 5 a supply of soda ash. In carrying out the invention in this apparatus, the molten salt mixture discharged from the recovery furnace through port 1 enters the auxiliary furnace 2 near one end, flows through this auxiliary furnace in contact with a charge of coke 6 maintained therein and is discharged through port 7 into the dissolving tank 4. An agitator 8 is provided to promote solution and to maintain uniformity in the dissolving tank 4. Molten sulphur from supply 3 in amount regulated by valve 9 is introduced into the auxiliary furnace 2 at about the point of introduction of the molten salt mixture from the recovery furnace. A temperature appropriate to maintain reducing conditions is maintained by operation of the fuel burner 10. A large part of the heat necessary for this purpose is supplied as sensible heat in the molten salt mixture from the recovery furnace. The added sulphur reacts with soda present in the molten salt mixture from the recovery furnace under the conditions maintained in the auxiliary furnace to form principally sodium sulphide which is thus incorporated in the fusion mixture discharged into the dissolving tank 4 from the auxiliary furnace 2. The soda required for makeup is added to the dissolving tank from supply 5 in amount controlled by feeder 11 to restore, in conjunction with the addition of sodium sulphide in the auxiliary furnace 2 and subsequent causticization of the green liquor formed in tank 4, the sodium hydroxide-sodium sulphide content of the cooking liquor. The green liquor thus formed in dissolving tank 4 is causticized with lime to form the white liquor to be re-used in the sulphate process cycle as cooking liquor. In carrying out this invention the recovery furnace is operated in the conventional manner except that makeup materials are not introduced into the recovery furnace and losses incident to such introduction of makeup chemicals are thereby avoided.

I claim:

In the regeneration of sodium hydroxide-sodium sulphide cooking liquors, the improvement which comprises carbonizing and burning black ash in a recovery furnace to produce a molten salt mixture, adding sulphur to the molten salt mixture discharged from the recovery furnace, passing the resulting mixture through a charge of coke while maintaining reducing conditions in an auxiliary furnace, dissolving the reduced mixture in water to form green liquor, adding soda ash to the green liquor and thereafter causticizing the green liquor to form regenerated cooking liquor.

WALTER LEE SAVELL.